(12) United States Patent
Durrant et al.

(10) Patent No.: US 6,839,539 B2
(45) Date of Patent: *Jan. 4, 2005

(54) RF SIGNAL REPEATER IN MOBILE COMMUNICATIONS SYSTEMS

(75) Inventors: Randolph L. Durrant, Colorado Springs, CO (US); Logan Scott, Breckenridge, CO (US); John K. Reece, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 10/173,912

(22) Filed: Jun. 17, 2002

(65) Prior Publication Data

US 2002/0155838 A1 Oct. 24, 2002

Related U.S. Application Data

(63) Continuation of application No. 09/596,653, filed on Jun. 19, 2000, now Pat. No. 6,501,955.

(51) Int. Cl.[7] ............................. H04B 7/15; H04Q 7/20
(52) U.S. Cl. ...................... 455/11.1; 455/456.5; 455/23
(58) Field of Search ........................... 455/456.1, 456.5, 455/7, 11.1, 404.1, 404.2, 9, 521, 524, 422.1, 13.2, 23; 342/450, 457, 453, 463; 375/134, 137

(56) References Cited

U.S. PATENT DOCUMENTS

| | | | | |
|---|---|---|---|---|
| 4,317,217 A | * | 2/1982 | Davidson | 455/24 |
| 4,383,331 A | * | 5/1983 | Davidson | 455/24 |
| 4,799,062 A | | 1/1989 | Sanderford, Jr. et al. | 342/450 |
| 5,483,241 A | | 1/1996 | Waineo et al. | 342/29 |
| 5,978,650 A | | 11/1999 | Fischer et al. | 725/73 |
| 6,108,364 A | | 8/2000 | Weaver, Jr. et al. | 375/130 |
| 6,236,365 B1 | | 5/2001 | LeBlanc et al. | 342/457 |
| 6,266,008 B1 | | 7/2001 | Huston et al. | 342/357.09 |

* cited by examiner

Primary Examiner—Lester G. Kincaid
Assistant Examiner—Rafael Perez-Gutierrez
(74) Attorney, Agent, or Firm—Blakely, Sokoloff, Taylor & Zafman LLP

(57) ABSTRACT

A RF signal repeater system is added to a wireless communications network which increases user data rates at the periphery of the cellular coverage area by boosting the downlink (base station to mobile user) signal and uplink (mobile user to base station) signal. The RF signal repeater system includes a signal tagging means that adds a unique electronic signature to the repeated signal such that position determination errors due to a non-line of sight propagation path can be corrected. The repeated signal is received and processed with a location measurement unit to determine the time of arrival and to extract the signal tag of the repeated signal. The time of arrival measurement and recovered signal tag are then processed at a mobile location center to determine the true position of the transmitter.

26 Claims, 6 Drawing Sheets

RF SIGNAL REPEATER IN MOBILE COMMUNICATIONS SYSTEMS

CLAIM OF PRIORITY

This is a continuation of application Ser. No. 09/596,653, filed on Jun. 19, 2000, now U.S. Pat. No. 6,501,955 B1.

FIELD

Embodiments of the invention relate to RF signal repeaters and more particularly, to the use of an RF signal repeater having an electronic signature imposed upon the repeated signal to allow identification of the signal repeater.

BACKGROUND

Wireless data services are used for remote access of e-mail, mobile Internet browsing, company information and others. To attract new and existing subscribers to data services, the operator need to support perceived data rates of 64 kbps or greater. Within GSM networks, two such services are General Packet Radio Service (GPRS) and Enhanced Data for GSM Evolution (EDGE). Both bring packet data connectivity to the GSM market at a variety of data rates. To support the high data rates in either service, however, requires increasing the signal-to-noise ratio (SNR) at the receiving handset. As a handset user travels further from a transmitting base station, the SNR must inevitably drop. For both GPRS and EDGE receivers, as the SNR drops, the bit error rate at the receiver will increase. In response, both services will shift the data transmission to a lower data rate, using more redundancy (channel coding) in the transmission to offset the lowered SNR. Thus, users will find that their realized data rate will decrease by a significant percentage when moved from locations near a cell base station toward the cell edges due to increased channel interference (C/I) and reduced signal-to-noise ratios (SNR). Typically, less than 20% of a cell area is estimated to be capable of the peak GPRS data rate in a coverage limited deployment.

One way to increase the data rates for these services would be to locate RF repeaters within a cell that retransmit the base station signals to handsets remote from the cell's base station. Similarly, the RF repeater could retransmit handset signals to the cell's base station. An inherent problem of repeating a signal transmission with little or no frequency translation is that the retransmitted signal may feedback into an RF repeater's receiving antenna. This unstable feedback problem is analogous to the familiar "howl" heard at public events when a speaker's microphone is too close to the loudspeakers. One way to combat this feedback problem would be the use of directional antennas in the RF repeater. For example, one directional antenna would be directed towards the base station and another directional antenna would be directed towards the mobile unit. Ordinarily, however, the RF repeater would not know the position of the mobile unit and would thus use an omni-directional antenna to communicate with the mobile unit. Moreover, even with the use of directional antennas, near field effects are very unpredictable and could cause substantial feedback. In contrast, frequency translation provides better isolation—the RF repeater would transmit and receive signals with the mobile unit on a different frequency band than that used to transmit and receive signals with the base station.

U.S. Pat. No. 5,970,410 discloses a wireless system architecture employing RF signal repeaters using frequency translation to permit a single home base station to communicate with mobile stations in a plurality of cells. Although this reference discloses the use of frequency translated repeaters [they are referred to as "translator base stations" but do not perform the conventional demodulation and modulation functions of a base station], the repeaters are used to extend the coverage of a home base station to additional cells. No teaching is made to use translators to increase the throughput of wireless communications within a given cell. U.S. Pat. No. 5,787,344 discloses an array of repeaters arranged in respective cell areas about a base station within a given cell.

The repeaters in the array may each be allocated different transmission frequencies. Such an arrangement of frequency translating repeaters is complicated if a transmission frequency of the base station is frequency hopping over time. If the signal to be repeated is not frequency hopped, the repeaters could be identified by their particular transmission frequency. If however, the repeaters had to repeat a frequency hopped signal, a given mobile unit would have to know what frequency hopping pattern would be followed by the repeater it is currently communicating with. This, in turn, would require a means for the mobile unit to identify a particular repeater within the array of repeaters. However, no teachings were made in U.S. Pat. No. 5,787,344 for enabling such an identification.

If RF signal repeaters are used to increase the throughput of wireless communication in a given cell, care must be taken not to interfere with the conventional cellular telephony functions. In particular, use of an RF signal repeater will interfere with estimating the location of a mobile unit—wireless networks are currently being enhanced to provide position measurement capability. These measurement methods provide the network with an estimate of the location of a mobile unit, such as for emergency 911 (E911) mobile phone service. Location Measurement Units (LMU) may be inserted either at the base station or at the mobile unit with time of arrival (TOA) signal processing means to estimate the distance from the mobile unit to the base station, assuming straight-line radio propagation.

Such straight-line radio propagation would not be present if RF repeaters are used to boost the mobile transmitted signals at the periphery of the coverage area. For example, a handset may be 2 miles due north of an RF repeater that in turn is 2 miles due east of a base station. The straight line distance between the handset and the base station is the hypotenuse (2.84 miles) of the right triangle formed by the handset, RF repeater, and base station. However, the actual path taken between the handset and the base station would be 4 miles: the 2 miles between the handset and the RF repeater and the 2 miles between the RF repeater and the base station. The use of an RF repeater thus results in significant location measurement errors for the repeated mobile signals.

One method for solving the erroneous E911 LMU distance calculation problem would be to co-locate an LMU next to each RF repeater along with a means for communicating the distance measurement information back to a network-based mobile location center. This method is inefficient in at least two ways: first, it requires an LMU at every repeater site which adds to costs and makes each repeater site bulkier; and second, a separate data link or additional data bits are needed to transmit the distance information to the base station.

Accordingly, there is a need for RF repeaters with the ability to enhance signal to noise and interference ratios over selected areas within a cell site, in particular to enable high data rate transmissions required by a wireless data system without interfering with an efficient location estimation of a mobile unit.

SUMMARY

The invention provides in one aspect an RF signal repeater that repeats signals transmitted between a mobile unit and a base station and received at the RF signal repeater in a given cell of a cellular wireless network. To provide isolation between the signals received at the RF signal repeater and the repeated signals, the RF, signal repeater frequency translates the repeated signals. The frequency translation may be on signals directed towards a mobile unit (forward link) and/or on signals directed towards the base station (reverse link).

In accordance with another aspect of the invention, a RF signal repeater is provided for repeating signals transmitted between a mobile unit and a base station. The RF signal repeater tags the repeated signal with an electronic signature so that signals passing between a mobile unit and a base station and through the RF signal repeater may be identified. The tagging may be on repeated signals in the forward link and/or on repeated signals in reverse link. The RF signal repeater may perform the electronic tagging through amplitude, phase, or frequency modulation. The modulation may be either analog or digital modulation. In embodiments of the invention utilizing digital modulation, shifts between chips in the digital modulation may be made synchronously between transmitted data frames in the repeated signal.

In accordance with another aspect of the invention, a Location Measurement Unit (LMU) is provided that can demodulate the electronic tagging performed by a RF signal repeater. By demodulating the electronic tagging, the LMU can identify the particular RF signal repeater that originated the repeated signal. LMUs may be co-located with either base stations or mobile units.

Other and further advantages of the invention will be further understood and appreciated by those skilled in the art by reference to the following specification, claims and drawings.

BRIEF DESCRIPTION OF THE DRAWINGS

The accompanying drawings, which are incorporated in and constitute a part of the specification, illustrate preferred embodiments of the invention, and together with the description, serve to explain the principles of the invention. Similar reference characters denote corresponding features consistently throughout the drawings.

DETAILED DESCRIPTION

Figure 1:
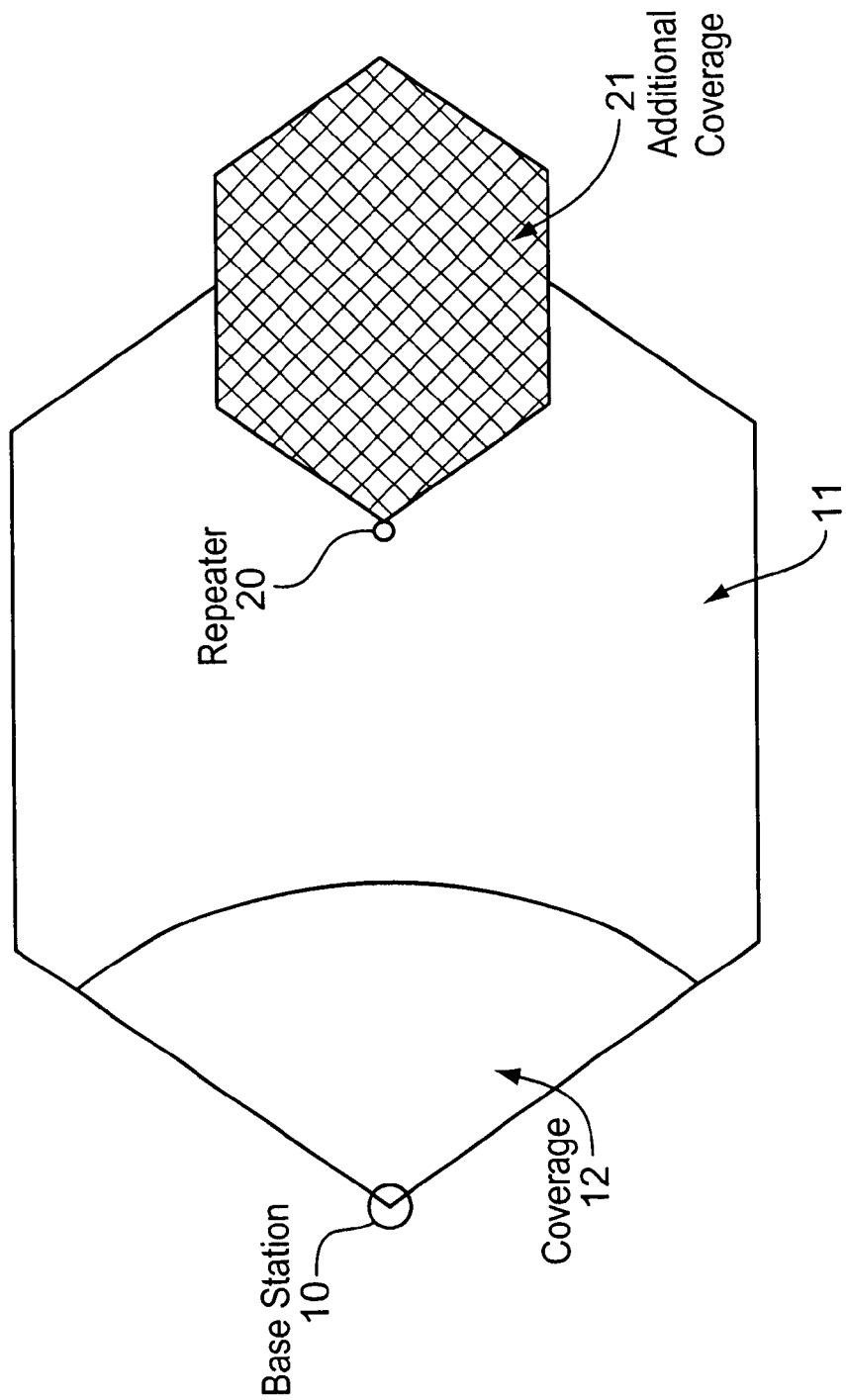
FIG. 1 is an illustration of a wireless communications cell site with additional high throughput coverage area provided by a RF signal repeater.

Reference will now be made in detail to the present preferred embodiments of the invention, examples of which are illustrated in the accompanying drawings, wherein like reference numerals indicate like elements throughout the several views.

The invention provides RF repeaters with the ability to enhance signal to noise and interference ratios over selected areas within a given cell, in particular to enable high data rate transmissions provided by modern wireless data services. Additionally, the invention provides RF repeaters with the ability to tag signals passing through the repeater with unique electronic signatures so that the true locations of the transmitting mobile units can be identified.

FIG. 1 is an illustration of a wireless communications cell site with additional high throughput coverage area provided by a RF signal repeater. A base station 10 has a defined coverage area or cell site 11. As signals propagate form the base station 10 through the cell 11, their strength will decrease. This drop in signal strength may adversely affect the realized data rates in current and proposed wireless data services. Two such wireless data services are GPRS and EDGE, both of which provide packet data capabilities for GSM cellular systems. For example, as GPRS is deployed, users will find that their realized data rate will decrease from 21.4 Kbps/time slot while located near a base station to 9.05 Kbps/time slot at cell sites remote from the base station. Indeed, it may be shown that less than 20% of a typical cell's area is estimated to support the peak data rate offered by GPRS. A similar situation will exist for future EDGE deployments with delivered data rates ranging from approximately 59.2 Kbps/time slot to 8.8 Kbps/time slot. Area 12 in FIG. 1 illustrates a region in cell 11 that would support the high data rate mode of a wireless service such as GPRS. A RF signal repeater 20 or a plurality of repeaters may be strategically added within the cell site 11 to enhance signal to noise and interference ratios in particular areas of the cell 11 to again provide the high data rate enjoyed in area 12. For example, the RF signal repeater 20 would receive the signals from the base station 10 and retransmit them as repeated signals, enabling the high data rate in region 21.

As previously discussed herein, the RF signal repeater 20 may provide isolation between the received signals and the repeated signals by frequency translating the repeated signals. Because GSM networks are already configured to support frequency hopping wherein the mobile station and the base station transceiver (BTS) may transmit within each time division multiple access (TDMA) data frame on a different carrier frequency (the carrier frequencies are spaced 200 kHz apart), a RF signal repeater within a GSM network could readily perform the frequency translation by translating the received signal to a different GSM carrier frequency. GSM networks will thus be assumed for the remaining discussion. That is not to imply, however, that the invention may not be implemented on other types of wireless networks such as a CDMA ANSI-95 network, TDMA IS-136, DECT, or the various IMT-2000 proposed architectures. Moreover, the frequency translation may be to other frequency bands as well. For example, a base station operating in the PCS band could be translated by the signal repeater to communicate with a mobile unit on the P-GSM 900 band or on bands made available in upcoming frequency auctions.

In addition to providing isolation between the received signals and the repeated signals, the RF signal repeater 20 may also tag the repeated signal with an electronic signature so that repeated signals may be distinguished from signals originating at either a mobile unit (not illustrated) or a base station 10. This electronic signature may comprise either amplitude, polarization, phase, or frequency modulation of the repeated signal. Regardless of the particular modulation chosen, it is preferably performed digitally to improve the demodulation and identification of a particular electronic signature. For example, for phase modulation and frequency modulation, a form of digital modulation for each would be a binary phase shift keying (BPSK) or a frequency shift keying (FSK) modulation, respectively. Using digital modulation, a binary or M-ary code could be imposed on the repeated signal. This code uniquely identifies a given RF signal repeater.

The digital modulation is imposed upon the requested signal by the RF signal repeater. The repeated signal contains the digital information being transmitted between a mobile unit and a base station. Shifts in the digital modulation between a given digital state (or chip) will occur either synchronously or asynchronously with transitions between bits in the digital information. Because a given burst will be garbled if the chip transition occurs while the burst is being transmitted, the digital modulation is preferably synchronous with the burst timing such that the chip transition occurs between bursts. For example, in a GSM network, the chip transition would be timed to occur in the guard times between TMDA data frames. A conventional GSM mobile unit will transmit in one of 8 times slots (burst periods) per TDMA data frame. Because these GSM mobile units may not be phase coherent from a burst in one TDMA frame to a burst in another TDMA frame, a phase modulation scheme such as BPSK would impose a phase modulation onto a random phase, resulting in another random phase for repeated signals based upon transmissions from a mobile unit. Thus, although phase modulation would be suitable for phase coherent transmissions (for example, GSM base stations are phase coherent burst-to-burst on the C0 RF channel), an FSK modulation scheme is preferable for repeating GSM mobile unit transmissions.

Because mobile units may be moving with respect to the base station, their transmissions may be Doppler-shifted. The Doppler shift is dependent on the frequency and the speed of the mobile unit. For example, at 1850 MHz (PCS band) for a mobile unit traveling towards a base station at 160 mph, the apparent frequency of signals received from the base station (one-way Doppler) will be increased by nearly 500 Hz. In turn, the signals received at the base station from the mobile unit (two-way Doppler) will be increased by approximately 1 kHz. Because GSM components can accommodate these frequency shifts (which would typically be smaller in practice since most mobile units travel considerably under 160 mph), an FSK scheme whose frequency shifts are within the range of acceptable Doppler shifts is a convenient way to provide the RF signal repeater's electronic signature on repeated signals. For example, the FSK shifts in frequency could be +/−300 Hz.

Figure 2:
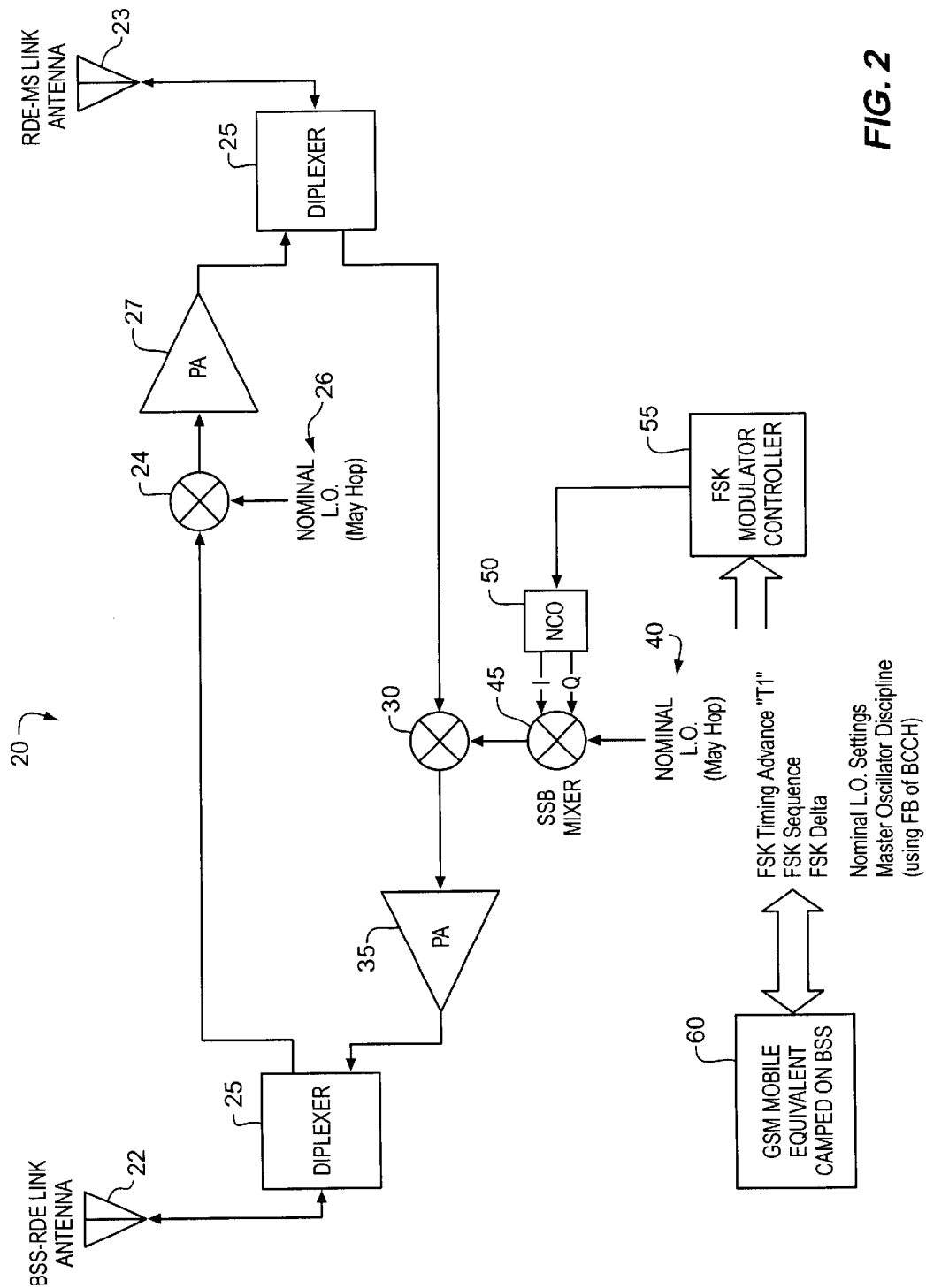
FIG. 2 shows a conceptual block diagram of an RF repeater with uplink signal tagging according to one embodiment of the invention.

FIG. 2 shows a conceptual block diagram of an RF repeater with an uplink (mobile station to base station) signal tagging according to the invention. In FIG. 2, the RF repeater comprises one antenna 22 for transmissions with the base station. Because the base station is fixed in position, antenna 22 is preferably a directional antenna whose beam is directed towards the base station. Another antenna 23 is used for transmissions with the mobile unit. In contrast to the base station, the mobile unit's location is usually unpredictable, requiring antenna 23 to be omni-directional or sectorized. Both antennas are coupled to diplexers 25 to enable each antenna to receive and transmit signals.

To prevent unstable feedback between the antennas 22 and 23, the RF signal repeater 20 performs frequency translation on the repeated signal. Consider the received base station transmissions. After reception by antenna 22, the base station (note that other filtering and mixing stages known in the art are omitted for clarity) enters mixer 24 for mixing with signal provided by a local oscillator. By beating the base station signal with the local oscillator signal 26, the base station signal is translated in frequency. The translated signal is amplified by power amplifier 27 before transmission by antenna 23 to form a repeated-translated base station signal for reception by a mobile unit. Similarly, the mobile station signal, after reception by antenna 23 (and passing through filtering, amplifying and mixing stages known in the art and omitted for clarity), passes through mixer 30 to form a translated mobile station signal. This translated mobile station signal is amplified in power amplifier 35 before transmission by antenna 22 to form a repeated-translated mobile station for reception by the base station. To form the uplink signal tagging or electronic signature, the local oscillator signal 40 is mixed in a single sideband (SSB) mixer 45 having in-phase (I) and quadrature (Q) inputs. A numerically controlled oscillator (NCO) 50 provides the I and Q inputs under the control of the FSK modulator controller 55. The FSK modulator controller 55 controls the I and Q inputs to shift the local oscillator signal up or down in frequency according to the particular type of FSK modulation chosen to identify the particular RF signal repeater 20 producing the repeated uplink signal.

As discussed earlier, GSM base stations and mobile units are equipped to frequency shift their signals in 200 kHz steps when operating in the PCS band. Thus, if mixers 24 and 30 produce their frequency translations in 200 kHz steps and the base station and mobile station are informed which frequency (channel) the repeated signals will be on, the RF signal repeater 20 may be used in a GSM network without requiring extensive reconfiguration of the network.

Since GSM components will also tolerate 300 Hz shifts to adjust for expected Doppler shifts in the PCS band, the FSK modulator controller 55 preferably shifts the local oscillator signal 40 in +/−300 Hz shifts. Note that a typical GSM signal has a bandwidth considerably in excess of 300 Hz. Thus, if a double sideband mixer were used to produce the FSK modulation in 300 Hz shifts, the translated signal would have overlapping spectrums of the upper sideband and the lower sideband. The use of a SSB mixer 45 avoids this spectral smearing or aliasing.

GSM mobile stations transmit in a given time slot per TDMA frame. To ensure a mobile station's signal does not collide with another mobile station's signal, the base station will command the mobile station to adjust the timing of its time slot transmission by a certain amount of timing advance. This timing advance adjusts for the propagation delay between the mobile station and the base station and ensures that the mobile station's signal will arrive at the base station in its proper time slot. The FSK modulation, to be synchronous with repeated data, must also receive a timing advance. This timing advance and other control information may be provided to the RF signal repeater 20 through the use of a GSM mobile equivalent 60. The mobile equivalent 60 would perform the functions of a GSM handset by demodulating and detecting transmissions from the base station but would not need to possess speakers, microphone, or vocoder. Hence, the term "mobile equivalent" rather than "mobile unit." The base station, through the GSM mobile equivalent 60, could command the RF signal repeater to use the required timing advance, which GSM channel the RF signal repeater should frequency translate the repeated signals to, and the FSK sequence and amount of FSK frequency shift. If the GSM mobile equivalent 60 supports GPRS, these commands could be sent to the GSM mobile equivalent 60 as packet data. The GSM mobile equivalent 60, through use of frequency corrections bursts (FB) present on the same non-frequency hopping carrier (designated C0) as the Broadcast Control Channel (BCCH) sent by the base station, would permit the RF signal repeater 20 to discipline its master oscillator, lowering costs. In addition, the GSM mobile equivalent 60 could dynamically control the number of RF channels supported if multiple co-located instantiations of the RF signal repeater are present at the same site. Moreover, the GSM mobile equivalent 60 could assist setup of the RF signal repeater by conveying PA settings, nominal LO values, and diagnostic information.

A squelch circuit (not illustrated) may be included with the RF signal repeater 20. As is known in the art, a squelch circuit would enable the RF signal repeater 20 to respond only when the received signals, either from the base station or the mobile unit, are of a sufficient strength to justify repetition. If the RF signal repeater 20 did not incorporate a squelch circuit, it may repeat "signals" when neither the base station or the mobile unit is signaling, thus amplifying and broadcasting noise. The threshold of determining whether signal is or is not present could be dynamically controlled through the GSM mobile equivalent 60. In general, the threshold would increase as the channel to interference ratio (C/I) decreased.

In a GSM network, the frequency hopping pattern is cyclic with a maximum period of about 391 seconds. Each TDMA data frame within the frequency hopping cycle is numbered sequentially. The GSM mobile equivalent 60 may use this TDMA numbering to synchronize the FSK modulation to the frame number of GSM "time." In this manner, a receiver operating to decode a particular FSK chip sequence need not search through every possible code phase if the receiver is also aware of the particular GSM frame number.

Figure 3:
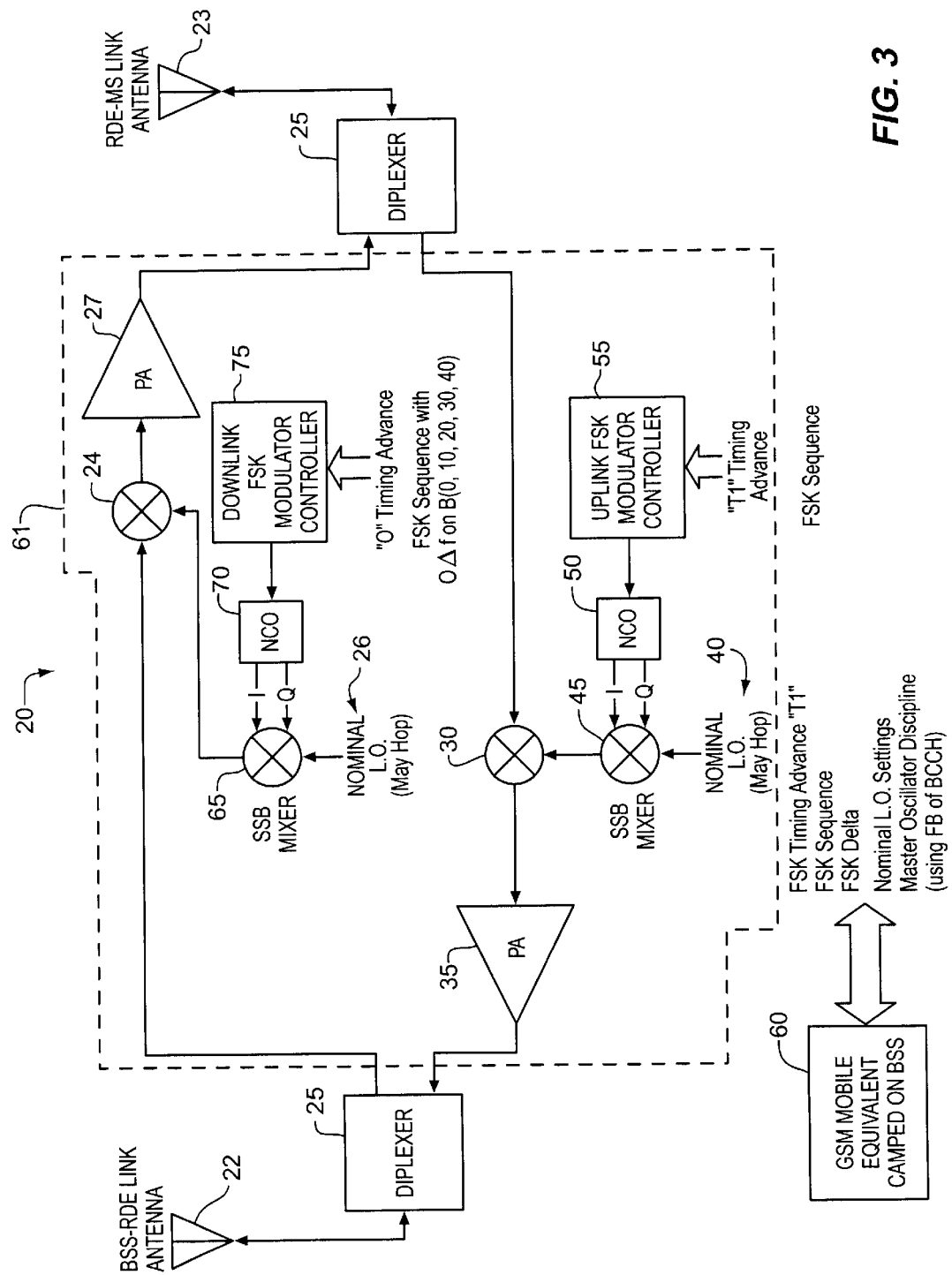
FIG. 3 shows a conceptual block diagram of an RF repeater with uplink and downlink signal tagging according to one embodiment of the invention.

Turning now to FIG. 3, in another embodiment, the RF signal repeater 20 can introduce signal tagging on both the downlink and uplink signals. The antennas 22 and 23, diplexers 25, power amplifiers 27 and 35, mixers 24 and 30, SSB mixer 45, NCO 50 and GSM mobile equivalent 60 are arranged as discussed with respect to FIG. 2. To tag the downlink signal, an additional SSB mixer 65 modulates the local oscillator signal 26 with I and O signals provided by NCO 70. A downlink FSK modulator controller 75 controls the NCO 70 to provide the required FSK modulation. Unlike the uplink FSK modulator controller 55, no timing advance is required for the downlink signal tagging.

The signal paths and components described between diplexers 25 form a translator module 61 that repeats signals transmitted between a base station and a mobile unit. Note that a single base station may have a plurality of transmit-receive modules. For example, a GSM base station may have N such modules because of the multiple frequency channels available across a frequency band. Each transmit-receive module would support its own 8 time slots in a given TDMA frame. Each base station transmit-receive module could in turn be supported by its own translator module 61 to perform the frequency translation and signal tagging of the invention. The frequency translation of all N translator modules 61 would, of course, have to be coordinated to keep the translated-repeated signals in band, prevent frequency conflicts between individual translator modules 61, and prevent frequency conflicts with other nearby base stations. The transmit/receive module supporting channel C0 does not frequency hop, whereas the N−1 other transmit/receive modules may frequency hop. A single GSM equivalent 60 could support the N translator modules 61. Although module 61 is in reference to a signal repeater supporting both uplink and downlink signal tagging, an embodiment supporting only uplink or downlink signal tagging would be constructed analogously.

If the signal repeater must repeat signals that are frequency hopped, such as GSM signals, the repeater should account for the frequency hopping to perform properly. In a GSM system, the frequency hopping may be cyclic or non-cyclic. In a cyclic frequency hopping system, the mobile unit and base station will each cycle through an integer N number of Absolute Radio Frequency Channel Numbers (ARFCNs) in a period of N TDMA frames. For example, a base station having a cyclic frequency hopping pattern with a period of 3 TDMA frames could use ARFCNs 1, 3, and 5. The base station would thus transmit on channel 1 for a given TDMA frame, on channel 3 for the next TDMA frame, and then channel 5 for the next TDMA frame. The cycle would then repeat over the following three TDMA frames and so on. In the PCS frequency band, because the mobile unit is required to transmit on an ARFCN separated by 80 MHz from the ARFCN utilized by the base station, a knowledge of what ARFCN the base station will transmit on also indicates the corresponding ARFCN the mobile unit must transmit on. In other bands, the duplex spacing is specified implicitly by the specific ARFCN in an analogous manner.

In a non-cyclic frequency hopping system, the base station may transmit on an arbitrary ARFCN in a given TDMA frame. The entire pattern of ARFCNs chosen will repeat every 391 seconds. Regardless of whether a base station is following a cyclic or non-cyclic frequency hopping pattern, a mobile unit must be aware of the frequency hopping patterns used by base stations in adjacent cells because the mobile unit may be required to handoff to these base stations as a mobile unit travels from cell-to-cell. A mobile unit may generate the proper ARFCN through use of the Mobile Allocation (MA) sent in the channel assignment message. The MA allocation is a subset of the Cell Allocation (CA). If frequency hopping is applied, the cell allocation is present in the message used to decode the mobile allocation. If the cell allocation is not included, a mobile station uses its current cell allocation, which is the last CA received on the BCCH. The current CA may be changed by some messages sent on the main signaling link containing a CA, such as the ASSIGNMENT COMMAND, HANDOVER COMMAND, and FREQUENCY REDEFINITION messages.

Having obtained the MA from the CA, a mobile station will determine the number N of ARFCNs within the MA, where 1<N<64. A mobile unit will generate a Mobile Allocation Index (MAI) as an index to the MA to select the ARFCN from the MA on a frame-by-frame basis. GSM protocol establishes the algorithms (collectively known as the hopping sequence generator) used by the mobile unit to generate the MAI from parameters such as the hopping sequence number transmitted in, e.g., the channel assignment message.

An embodiment of the invention performs a frequency hopping transform by defining an extended Mobile Allocation (MA). The extended MA would consist of two parts: a forward link translation table, and a reverse link translation table. Each entry or index into the translation table would return not only the frequency (which may be given by the ARFCN) but also an offset. The offset represents the frequency duplex offset between the uplink and downlink signals. Because the offset is specified, the signal repeater could translate from one frequency band to other bands having different frequency duplex offsets. For example, GSM systems have a different frequency offset in the 900 MHz band (45 MHz) than the one used at 1800 MHz band (80 MHz). The extended MA provides a great deal of flexibility in designing a hopping transform. For example, a base station that is frequency hopping from TDMA frame to TDMA frame could be translated by a signal repeater to a mobile station that does not frequency hop at all. Alternatively, the signal repeater could provide a fixed but large amount of frequency translation to each burst such that the mobile station is on a different band than that used by the base station. Moreover, an arbitrary frequency hopping pattern used by the base station could be transformed into another arbitrary frequency hopping pattern by the signal repeater, provided that collisions between the translated signals and signals from neighboring cells are substantially avoided. In this fashion, no frequency channels need be reserved for exclusive use in the "backhaul" link between a signal repeater and a base station.

For certain applications such as indoor, rural, or tunnel environments, it may prove desirable to chain RF signal repeaters together to repeat signals between a base station and a mobile unit. In such applications, it would be preferable that a repeater-repeater antenna for communicating between RF signal repeaters be directional just as the RF signal repeater to base station antenna 22 is in FIGS. 2 and 3. Thus, the RF signal repeater may use antenna switching to support the directional repeater-to-repeater traffic and the omni-directional repeater-to-mobile station traffic. This antenna switching could occur on a time slot by time slot basis under control of the GSM mobile equivalent.

In embodiments of the invention supporting RF signal repeater chaining, the signal tagging will need to be coordinated to uniquely identify all the RF signal repeaters used in a particular chaining sequence. Because the GSM mobile equivalent can identify the TDMA frame number currently being broadcast, the chaining may be synchronized to the GSM cycle. RF signal repeaters at a particular chain depth would impose their signature sequences (e.g., FSK sequences) while other RF signal repeaters at other chain depths do not. A receiver could then decode the signal path by identifying the sequence of RF signal repeaters used in a given chaining sequence.

The electronic signature of signal tagging performed by the invention allows repeated signals to be uniquely associated with the RF signal repeater that originated the repeated signals. One application that may use the signal tagging information is mobile unit position measurement provided by Location Measurement Units (LMU). These measurement methods provide the network with an estimate of the location of a mobile unit, such as for emergency 911 (E911) mobile phone service. Location Measurement Units (LMU) may be inserted into the network to calculate a mobile unit's position. Under the network reference model found in 03.71 (T1P1.5/99-565), an LMU may be associated with the mobile station (LMU-A) or with the network side, e.g., the base station (LMU-B). An LMU-A measures the time of arrival (TOA) or time difference of arrival (TDOA) of base station downlink signals using normal bursts and dummy bursts. An LMU-B measures the TOA or TDOA of mobile unit uplink signals based on access bursts generated in response to an RR_HANDOVER_COMMAND signal.

Figure 4:
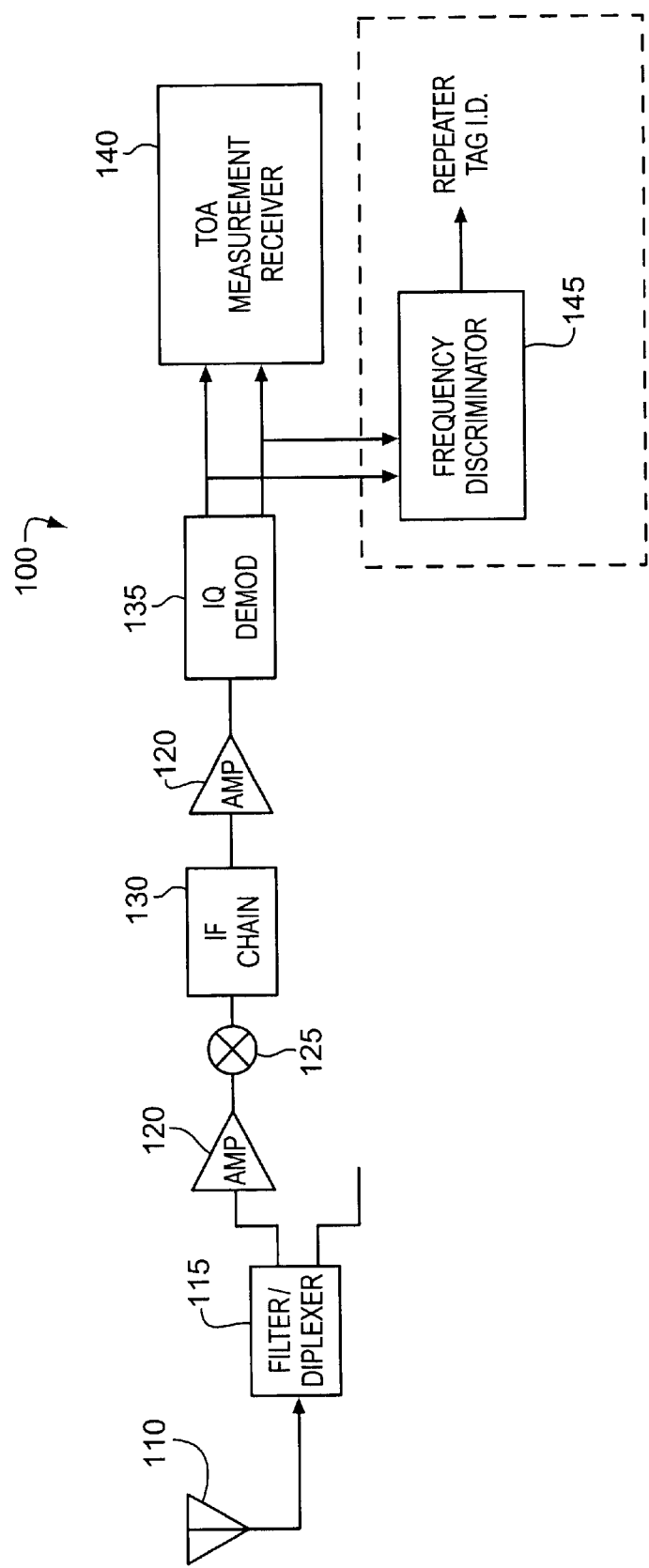
FIG. 4 shows a conceptual block diagram of a location measurement unit with circuitry to detect tagged signals according to the present invention.

FIG. 4 shows a conceptual block diagram of a location measurement unit (LMU-B) 100 with circuitry to detect tagged signals according to the invention. In existing and proposed wireless networks, the base stations may include the LMU-B 100 to identify the location of a mobile unit. The LMU-B 100 comprises a diplexed antenna 110, a filter/diplexer 115, amplifiers 120, a mixer 125, IF chain 130 and I/Q demodulator 135. This portion of the LMU-B 100 implementation is disclosed for illustrative purposes only. Other implementations of this portion of the LMU-B will be understood by those skilled in the art. In the present invention, the LMU-B 100 additionally incorporates a time of arrival (TOA) receiver 140 to measure the propagation time delay between the mobile unit and LMU, and subsequently, this time delay measurement may be converted to a distance measurement, assuming straight line propagation. However, with the addition of RF signal repeaters to the network, errors in the position determination will be introduced because the assumption of straight line propagation is no longer valid. Hence, unique signal tags are introduced by the FSK modulation as shown in FIGS. 2 and 3. These unique signal tags are detected by the frequency discriminator 145 in the LMU-B that detects the signal tags to generate the repeater tag ID.

Figure 5:
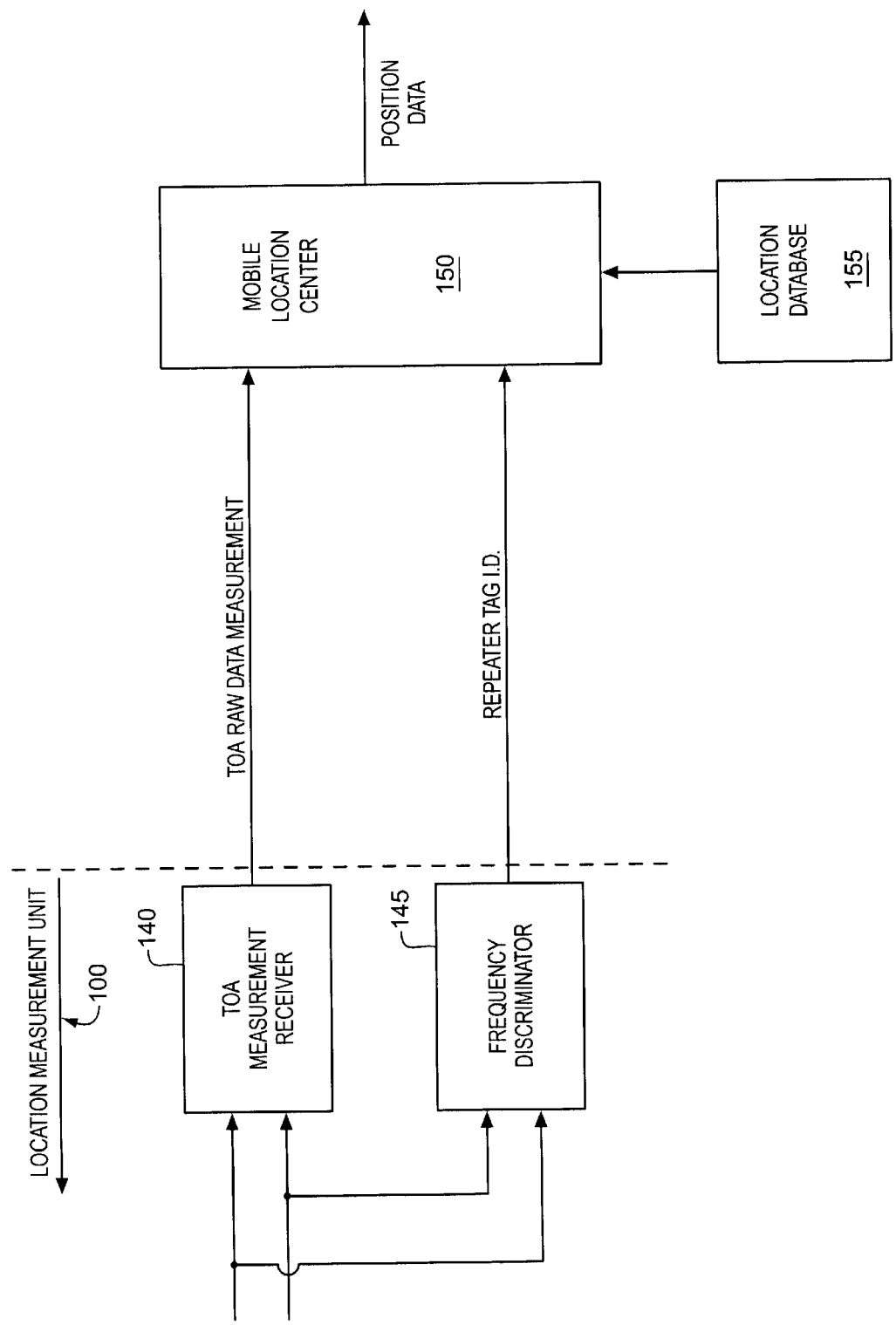
FIG. 5 shows the interaction between the location measurement unit and the mobile location center according to the present invention.

Turning now to FIG. 5, the TOA measurements and repeater tag ID are coupled to the Mobile Location Center (MLC) 150. The MLC 150 determines the true position of the mobile unit from the TOA receiver measurements, the reported repeater tag ID information, and a database 155 which includes geographical coordinates of the identified repeater(s) and any involved base stations.

Figure 6:
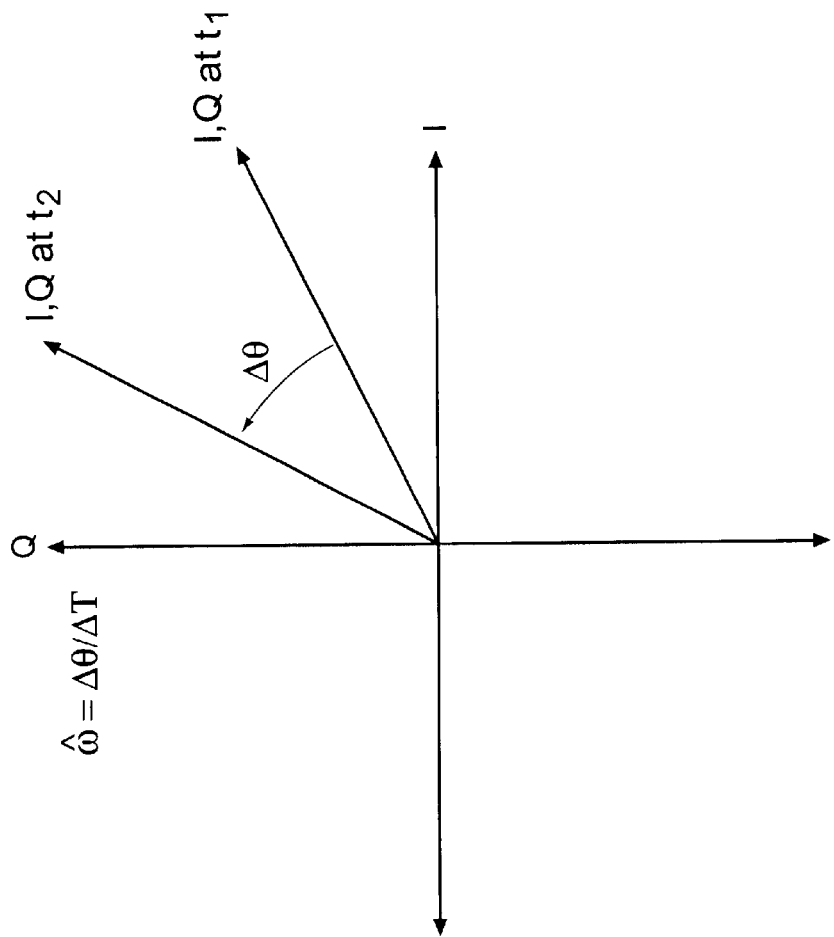
FIG. 6 illustrates the operation of an arctangent frequency discriminator.

An LMU-A would be constructed similarly, having a TOA processing receiver and a frequency discriminator to demodulate the FSK sequence. Regardless of whether it is installed in an LMU-A or LMU-B, the frequency discriminator may be an arctangent based frequency discriminator. Turning now to FIG. 6, the operation of such a discriminator is demonstrated. At a given time $t_1$, the phase of the signal is represented by the I, Q vector t1. At a later time $t_2$, the phase is represented by the I, Q vector $t_2$. The instantaneous frequency is given by the ratio of the angle, $\Delta\Theta$ between the two vectors and the time difference between $t_1$ and $t_2$. Alternatively, an $I_n Q_{n-1} - I_{n-1} Q_n$ style discriminator may be used, although it may not possess the same gain invariance and threshold performance. A data assisted frequency estimator such as described in "An Efficient Carrier Recovery Scheme for GSM Receivers," M. Luise and R. Reggiannini, IEEE CTMC/GLOBECOM '92, Orlando Fla. may also be used and will take advantage of the burst training and synchronization sequences.

In embodiments of the invention wherein the RF signal repeater includes a GSM mobile equivalent such that the FSK signature sequences are synchronized to the cyclic TDMA frame structure of the controlling base station, an LMU may simplify its decoding of the FSK signature. The LMU may identify the base station synchronization either through receiving the RR_HANDOVER_COMMAND signal or by receiving the Synchronization Channel (SCH). The LMU will then not need to search a multiplicity of FSK code phases to decode a particular FSK sequence.

The coding of the FSK sequences, under synchronized conditions, should seek to maximize the minimum distance between codes. A number of different coding schemes are suitable such as Gold, Kasami, or Maximum Length (ML) codes. For an LMU-A, which must identify a particular RF signal repeater through either normal bursts or frequency bursts/dummy bursts, the coding scheme may depend upon which type of bursts are used. The frequency burst and dummy bursts have essentially the same structure except for the specific length 142 "fixed bits" used. For such bursts, the frequency discriminator may increase its predetection integration times by a factor of 7.4 dB relative to those used with Normal Burst (NB). At a relatively low SNR, this corresponds to a roughly 15 dB improvement in frequency discriminator output SNR, allowing a major reduction in FSK bit error rate. Thus, at low signal levels, a dual code structure may be preferable; one scheme for the normal bursts and another for the frequency bursts/dummy bursts that takes much longer to read.

An additional code structure is also desirable so that a mobile station may determine, while in an idle mode, whether the mobile station is receiving a signal directly from a base station or, instead, is receiving a repeated (and possibly translated) base station signal via the signal repeater. This is desirable so that the mobile station may know, for example, what the appropriate Mobile Allocation (MA) and frequency translation is for a given signal. A new System Information (SI) element in the Broadcast Control Channel (BCCH) may be used to identify the Cell Allocation (which indirectly provides the MA) for each signal repeater a mobile unit may be communicating with. To identify which signal repeater has repeated the signal, a unique FSK sequence is imposed on the BCCH signal by the repeating signal repeater. As with the FSK sequence imposed on the frequency bursts, this sequence may be the same as that used on the normal bursts or may be different. By listening solely to the BCCH, a mobile station may identify which signal repeater repeated the signal.

Those of ordinary skill will appreciate that many different embodiments of the invention may be constructed. For example, rather than employ FSK modulation to perform the signal tagging, BPSK modulation may be used. Moreover, the RF signal repeaters of the invention may be used in other TDMA or CDMA networks in addition to GSM networks. Thus, it is understood that other embodiments of the present invention can be fabricated and be within the spirit and scope of the appended claims.

What is claimed is:

1. A signal repeater comprising:
   a receive antenna;
   a receiver coupled to the receive antenna to receive radio frequency communication bursts from a mobile unit of a wireless mobile communications network;
   a mixer to translate the carrier frequency of the received bursts;
   a signal processor to tag the received bursts with a digital modulation identifying the signal repeater, the digital modulation being synchronous with the burst timing;
   a transmit antenna; and
   a transmitter coupled to the transmit antenna to transmit the frequency translated tagged bursts from the signal repeater to a base station of the wireless mobile communications network.

2. The repeater of claim 1, wherein the signal processor applies the digital modulation-to the received signal, using a code having a chip transition between bursts.

3. The repeater of claim 2, wherein the digital modulation comprises a frequency shift keying modulation.

4. A method of communication comprising:
   receiving at a signal repeater of a wireless mobile communications network, a communications burst from one of a base station of the wireless mobile communications network and a mobile unit of the wireless mobile communications network;
   imposing a digital modulation on the received communications burst to identify the signal repeaters, the imposed modulation being synchronous with the burst timing; and
   transmitting the modulation imposed burst from the signal repeater to the other of the base station and the mobile unit.

5. The method of claim 4, wherein receiving at the signal repeater comprises receiving a downlink signal from the base station and wherein transmitting the modulation imposed burst comprises transmitting modulation imposed burst to the mobile unit as a downlink signal.

6. The method of claim 4, wherein receiving at the signal repeater comprises receiving an uplink signal from the mobile unit and wherein transmitting the modulation imposed burst comprises transmitting the modulation imposed burst to the base station as an uplink signal.

7. The method of claim 4, further comprising translating the frequency of the received signal so that transmitting the modulation imposed burst is performed on a different carrier frequency from receiving the signal.

8. The method of claim 7, wherein receiving the communications burst comprises receiving the communications burst using a first frequency hopping pattern, and wherein transmitting the modulation imposed burst comprises transmitting using a second frequency hopping pattern.

9. The method of claim 4, further comprising transmitting a plurality of modulation imposed bursts, and wherein imposing a digital modulation comprises applying a code having a chip transition between bursts.

10. The method of claim 9, wherein the chip transition is within a guard time between bursts.

11. The method of claim 4, further comprising generating the digital modulation at the signal repeater.

12. The method of claim 11, wherein imposing a digital modulation on the received signal comprises mixing the received communications burst at the signal repeater with the digital modulation generated at the signal repeater.

13. The method of claim 12, wherein the digital modulation comprises an M-ary code, the M-ary code identifying the signal repeater.

14. The method of claim 13, further comprising receiving a timing advance from the base station and wherein transmitting the modulation imposed burst comprises applying the received timing advance.

15. The method of claim 12, wherein the digital modulation comprises a frequency shift keying modulation.

16. The method of claim 15, wherein imposing the frequency shift keyed modulation comprises applying the modulation to the received communication burst using a single sideband mixer.

17. The method of claim 15, wherein the frequency shift keyed modulation shifts frequency by an amount within the tolerated Doppler shift for the received communication burst.

18. An apparatus comprising:
   means for receiving a radio frequency communication burst from one of a base station of a wireless mobile communications network and a mobile unit of the wireless mobile communications network;
   means for tagging the received burst with digital modulation identifying a signal repeater, the digital modulation being synchronous with the burst timing; and
   means for transmitting the tagged burst from the signal repeater to the other of the base station and the mobile unit.

19. The apparatus of claim 18, wherein the means for tagging tags the communication burst by mixing the received communications burst with a digital modulation generated by the repeater.

20. The apparatus of claim 19, wherein the digital modulation comprises a frequency shift keying modulation.

21. The apparatus of claim 18, wherein the means for tagging applies an M-ary code to the received burst, the M-ary code identifying the signal repeater.

22. A signal repeater comprising: a receiver to receive radio frequency communication burst from one of a base station of a wireless mobile communications network and a mobile unit of the wireless mobile communications network;
- a signal processor to tag the received communication burst with digital modulation identifying the signal repeater, the digital modulation being synchronous with the burst timing; and
- a transmitter to transmit the tagged burst from the signal repeater to the other of the base station and the mobile unit.

23. The repeater of claim 22, wherein the transmitter transmits a sequence of tagged bursts as discrete bursts, and wherein the signal processor tags the bursts by applying a code having a chip transition between bursts.

24. The repeater of claim 22, wherein the signal processor tags the communication burst by mixing the received communications burst with a digital modulation generated by the repeater.

25. The repeater of claim 24, wherein the digital modulation comprises a frequency shift keying modulation.

26. The repeater of claim 22, wherein the digital modulation comprises an M-ary code, the M-ary code identifying the signal repeater.

* * * * *

UNITED STATES PATENT AND TRADEMARK OFFICE
CERTIFICATE OF CORRECTION

PATENT NO. : 6,839,539 B2
DATED : January 4, 2005
INVENTOR(S) : Durrant et al.

It is certified that error appears in the above-identified patent and that said Letters Patent is hereby corrected as shown below:

Column 11,
Line 65, delete "repeaters" and insert -- repeater --.

Signed and Sealed this

Third Day of May, 2005

JON W. DUDAS
*Director of the United States Patent and Trademark Office*